US012796687B2

(12) United States Patent
Moon et al.

(10) Patent No.: US 12,796,687 B2

(45) Date of Patent: Nov. 17, 2026

(54) COMPOUND, ANTIMICROBIAL DEODORANT COMPOSITION COMPRISING SAME, AND METHOD FOR PRODUCING SAME

(71) Applicant: LG Chem, Ltd., Seoul (KR)

(72) Inventors: Hyeran Moon, Daejeon (KR); Haesung Yun, Daejeon (KR); Hyungsam Choi, Daejeon (KR); Byungguk Kim, Daejeon (KR); Seonjung Jung, Daejeon (KR); Sanggon Kim, Daejeon (KR); Ji Seok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 792 days.

(21) Appl. No.: 17/786,183

(22) PCT Filed: Sep. 16, 2021

(86) PCT No.: PCT/KR2021/012668

§ 371 (c)(1),
(2) Date: Jun. 16, 2022

(87) PCT Pub. No.: WO2022/060116

PCT Pub. Date: Mar. 24, 2022

(65) Prior Publication Data

US 2023/0056935 A1 Feb. 23, 2023

(30) Foreign Application Priority Data

Sep. 16, 2020 (KR) ........................ 10-2020-0119287
Sep. 15, 2021 (KR) ........................ 10-2021-0122917
Sep. 15, 2021 (KR) ........................ 10-2021-0123311

(51) Int. Cl.

*A01N 47/16* (2006.01)
*A01P 1/00* (2006.01)
*C08F 120/36* (2006.01)
*C08L 33/14* (2006.01)

(52) U.S. Cl.

CPC ................ *A01N 47/16* (2013.01); *A01P 1/00* (2021.08); *C08F 120/36* (2013.01); *C08L 33/14* (2013.01)

(58) Field of Classification Search

CPC ...................................................... A01N 47/16
See application file for complete search history.

(56) References Cited

U.S. PATENT DOCUMENTS

| | | | |
|---|---|---|---|
| 6,060,207 A | 5/2000 | Shida et al. | |
| 6,150,479 A | 11/2000 | Klemarczyk et al. | |
| 9,475,967 B2 | 10/2016 | Lipscomb et al. | |
| 12,534,552 B2 * | 1/2026 | Kim | C08F 120/36 |
| 2009/0208740 A1 | 8/2009 | Kavanagh et al. | |
| 2009/0324536 A1 | 12/2009 | Sun et al. | |
| 2010/0151388 A1 * | 6/2010 | Yang | C08F 220/283 548/531 |
| 2010/0222426 A1 | 9/2010 | Gibbons et al. | |
| 2010/0240923 A1 | 9/2010 | Haering et al. | |
| 2014/0294968 A1 | 10/2014 | Hofmann et al. | |
| 2015/0037526 A1 | 2/2015 | Seth et al. | |
| 2016/0060492 A1 | 3/2016 | Zhang et al. | |
| 2018/0141080 A1 | 5/2018 | Kirk et al. | |
| 2019/0218423 A1 | 7/2019 | Bartusiak et al. | |
| 2020/0369590 A1 | 11/2020 | Van Campenhout et al. | |
| 2021/0108017 A1 | 4/2021 | Krayer et al. | |

FOREIGN PATENT DOCUMENTS

| | | |
|---|---|---|
| CN | 102131836 A | 7/2011 |
| CN | 102167681 B | 10/2012 |
| CN | 103881010 A | 6/2014 |
| CN | 110668942 A | 1/2020 |
| CN | 110724229 A | 1/2020 |
| CN | 110981999 A | 4/2020 |
| JP | 2004217528 A | 8/2004 |
| JP | 2006152035 A | 6/2006 |
| JP | 2008050415 A | 3/2008 |
| JP | 2010539150 A | 12/2010 |
| KR | 100601393 B1 | 7/2006 |
| KR | 20100068083 A | 6/2010 |
| KR | 20100093404 A | 8/2010 |
| KR | 20140051314 A | 4/2014 |
| KR | 20200098865 A | 8/2020 |
| WO | 2006057086 A1 | 6/2006 |
| WO | 2012069908 A2 | 5/2012 |
| WO | 2015157019 A1 | 10/2015 |
| WO | 2020-095808 A1 | 5/2020 |

OTHER PUBLICATIONS

International Search Report for Application No. PCT/KR2021/012606 mailed Dec. 30, 2021, pp. 1-3.
Zhao, J. et al., "Synthesis of Terpene-Based Polymers," Biosynthetic Polymer Conjugates, Mar. 2012, pp. 151-190, vol. 253, Springer, Berlin.
De Visser, A. C. et al., "Bulk Polymerization of Cholesteryl Acrylate," Polymer Letters, Nov. 1970, pp. 805-808, vol. 8, John Wiley & Sons.
Stebbins Nicholas D et al: "Antibiotic-containing polymers for localized, sustained drug delivery", Aavanced Drug Delivery Reviews, Elsevier, Amsterdam , NL, vol. 78, Apr. 18, 2014 (Apr. 18, 2014), pp. 77-87, XP029104077.

(Continued)

*Primary Examiner* — Carlos A Azpuru

(74) *Attorney, Agent, or Firm* — Lerner David LLP

(57) ABSTRACT

A compound of Chemical Formula 1, an antibacterial and deodorizing composition including the compound of Chemical Formula 1, and a method for preparing the same. By copolymerizing the compound of Chemical Formula to a polymer, excellent antibacterial and deodorizing effects can be provided to the polymer without leaking the compound.

9 Claims, No Drawings

(56) References Cited

OTHER PUBLICATIONS

Turos, E. et al., "Antibiotic-conjugated polyacrylate nanoparticles: New opportunities for development of anti-MRSA agents" Bioorganic & Medicinal Chemistry Letters, Elsevier Ltd, Dec. 2006, vol. 17, No. 1, pp. 53-56.
Kalayci, S. et al., "Determination of antimicrobial properties of Picaridin and DEET against a broad range of microorganisms" World Journal of Microbiology and Biotechnology, Springer Netherlands, Aug. 2013, vol. 30, No. 2, pp. 407-411.
Extended European Search Report including Written Opinion for Application No. 21869713.4 dated Apr. 3, 2023, pp. 1-10.
Search Report dated Nov. 27, 2023 from Office Action for Chinese Application No. 202180007045.X, issued Nov. 30, 2023. 2 pgs.
Extended European Search Report for Application No. 21869738.1 dated May 22, 2023. 2 pgs.
Agasti, S. et al., "Orthogonal Selectivity in C—H Olefination: Synthesis of Branched Vinylarene with Unactivated Aliphatic Substitution," ACS Catalysis, Sep. 2019, pp. 9606-9613, vol. 9.
Castagnet, T. et al., "Non-thermal Microwave Effects in Radical Polymerization of Bio-based Terpenoid (Meth) acrylates," Polymer Chemistry, Oct. 2020, pp. 1-8.
Chapman, R. S. L. et al., "Formyloxyacetoxyphenylmethane and 1,1-diacylals as versatile O-formylating and Oacylating reagents for alcohols," Tetrahedron, Sep. 2018, pp. 1-12.
Chen, H. et al., "Sterically Controlled C—H Olefination of Heteroarenes," Angewandte Chemie, Jul. 2020, pp. 1-9.
Droesbeke, M. A. et al., "Biosourced terpenoids for the development of sustainable acrylic pressure-sensitive adhesives via emulsion polymerisation," Green Chemistry, Jun. 2020, pp. 1-10.
Droesbeke, M. A. et al., "Sustainable Synthesis of Renewable Terpenoid-Based (Meth)acrylates Using the CHEM21 Green Metrics Toolkit," ACS Sustainable, May 2019, pp. 11633-11639, vol. 7.
Heeres, A. et al."Solvent-Free Lipase-Catalyzed Production of (Meth)acrylate Monomers: Experimental Results and Kinetic Modeling," Biochemical Engineering Journal, Nov. 2018, pp. 1-27.
Huang, X. et al., "Combining the catalytic enantioselective reaction of visible-light-generated radicals with a by-product utilization system," Chemical Science, Sep. 2017, pp. 1-6.
International Search Report for Application No. PCT/KR2021/012668 mailed Dec. 28, 2021, pp. 1-3.
Kumar, M. et al., "Ru(II)-Catalyzed Oxidative Olefination of Benzamides: Switchable Aza-Michael and Aza-Wacker Reaction for Synthesis of Isoindolinones," Organic Letters, Apr. 2020, pp. A-G.
Li, Y. et al., "An efficient DABCO-catalyzed ireland-claisen rearrangement of allylic acrylates," Chem. Inform, Feb. 2007, 1 page.
Lokhande. G. P. et al., "Synthesis ofN-(2 mnino benzothiazole) methacylmnide monomer and its copolymers for antimicrobial coating application by RAFT polymerization," International Journal of Polymeric Materials and Polymeric Biomaterials, Dec. 2015. vol. 65. pp. 391-401.
Lv, Y. et al., "Cu-catalyzed intermolecular oxyalkylation of styrenes under air: access to diverse iminolactones," RSC Advances, Aug. 2017, pp. 41723-41726.
Meng, K. et al., "Geminal group-directed olefinic C—H functionalization via four- to eight-membered exo-metallocycles," Nature Communications, Nov. 2019, pp. 1-10.
Ng, J. Q. et al., "Chemoselective Transesterification of Methyl (Meth)acrylates Catalyzed by Sodium(I) or Magnesium(II) Aryloxides," ACS Catalysis, Dec. 2020, pp. 199-207, vol. 11.
Qiu, Y. et al., "Electrooxidative Rhodium-Catalyzed C—H/C—H Activation: Electricity as Oxidant for Cross-Dehydrogenative Alkenylation," Angewandte Chemie, May 2018, pp. 1-7.
Rehberg, C. E. et al., "Preparation and Polymerization of Acrylic Esters of Olefinic Alcohols," Contribution from the Eastern Regional Research Laboratory, Aug. 1946, pp. 226-231.
Richter, C. et al., "Tailor-made N-Heterocyclic Carbenes for Nanoparticle Stabilization," Chem. Comm., Jan. 2014, pp. 1-4.
Russell, G.A. et al., "8-Endo versus 5-Exo Cyclization of Unsaturated Acrylate Esters upon Reaction with t-BuHgi/KI" Tetrahedron Letters, vol. 37, No. 15, pp. 2557-2560, Apr. 1996.
Russell, G.A. et al., "Cyclizations in the Addition of Alkylmercury Halides to Dienes and Enynes," Journal of Chemical Society, Oct. 1996, pp. 9831-9840, vol. 118.
Tale. N. V. et al. "Synthesis and polymerization of N-(2,4,5-trichlorophenyl) acrylamide monomer and its thermal and antimicrobial properties," International Journal of Polymeric Materials, Nov. 2011. vol. 60. pp. 1070-1078.
Wang, M. et al., "Mizoroki-Heck Reaction of Unstrained Aryl Ketones via Ligand-Promoted C—C Bond Olefination" Oragnic Letters, May 2021, pp. 2147-2152, vol. 23.
Worzakowska, M. "Thermal studies on the starch-g-copolymers prepared from two terpene acrylate monomers under oxidative conditions," Journal of Thermal Analysis and Calorimetry, Feb. 2019, pp. 1-7.
Worzakowska, M., "Novel starch-g-copolymers obtained using acrylate monomers prepared from two geometric somers of terpene alcohol," European Polymer Journal, Nov. 2018, pp. 1-36.
Worzakowska, M., "Synthesis and some physico-chemical properties of novel starch-g-poly(citronellyl acrylate) copolymers," Maria Curie-Sklodowska University, Feb. 2018, pp. 1-26.
Worzakowska, M., "Thermo-oxidative decomposition behavior of starch-g-poly(citronellyl methacrylate) and starch-g-poly(citronellyl acrylate) copolymers," Journal of Thermal Analysis and Calorimetry, Jan. 2018, pp. 1-9.
Xu, J. et al., "Nickel-Catalysed Cyclopropanation of Electron-Deficient Alkenes with Diiodomethane and Diethylzinc," Communication, Jan. 2016, pp. 1-5.
Zhang, J. et al., "Acid- and Base-Switched Palladium-Catalyzed y-C(sp3)-H Alkylation and Alkenylation of Neopentylamine" Organic Letters, Apr. 2021, pp. 3466-3471, vol. 23.

* cited by examiner

COMPOUND, ANTIMICROBIAL DEODORANT COMPOSITION COMPRISING SAME, AND METHOD FOR PRODUCING SAME

CROSS-REFERENCE TO RELATED APPLICATIONS

The present application is a national phase entry under 35 U.S.C. § 371 of International Application No. PCT/KR2021/012668, filed on Sep. 16, 2021, which claims priority from Korean Patent Application No. 10-2020-0119287, filed on Sep. 16, 2020, Korean Patent Application No. 10-2021-0122917, filed on Sep. 15, 2021 and Korean Patent Application No. 10-2021-0123311, filed on Sep. 15, 2021, the entire contents of which are incorporated herein by reference.

TECHNICAL FIELD

The present specification relates to a compound, an antibacterial and deodorizing composition including the same, and a method for preparing the same.

BACKGROUND ART

As damage caused by microorganisms harmful to the human body and causing odors such as bacteria and mold increases in everyday life, various antibacterial substances or deodorizing substances for inhibiting or killing growth of such microorganisms have been developed. As one of these, antibacterial or deodorizing properties have been required for polymer materials used in products frequently used in general.

In order to introduce antibacterial properties to a polymer, a method of simply mixing an antibacterial substance to the polymer has been mainly used in the art. Since this has a possibility of leaking the antibacterial substance, safety of the used antibacterial substance needs to be ensured. In order to fundamentally resolve problems caused by antibacterial substance leakage, studies on development of antibacterial polymers with no antibacterial substance leakage through copolymerizing an antibacterial substance to a polymer have also been actively conducted.

DISCLOSURE

Technical Problem

The present specification is directed to providing a compound, an antibacterial and deodorizing composition including the same, and a method for preparing the same.

Technical Solution

One embodiment of the present specification provides a compound of the following Chemical Formula 1.

[Chemical Formula 1]

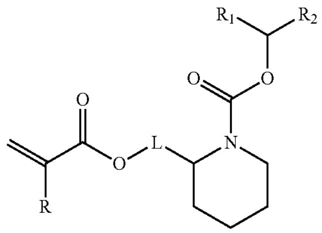

In Chemical Formula 1,

L is a direct bond; or an alkylene group having 1 to 10 carbon atoms,

R is hydrogen; or an alkyl group having 1 to 10 carbon atoms, and $R_1$ and $R_2$ are each independently hydrogen; an alkyl group having 1 to 10 carbon atoms; or an aryl group having 6 to 30 carbon atoms.

Another embodiment of the present specification provides an antibacterial and deodorizing composition including the compound.

Another embodiment of the present specification provides a method for preparing the compound.

Advantageous Effects

A compound according to the present specification is capable of providing improved antibacterial and deodorizing properties.

By copolymerizing the compound according to the present specification to a polymer, excellent antibacterial and deodorizing effects can be provided to the polymer without leaking the compound.

MODE FOR DISCLOSURE

In the present specification, a description of a certain part "including" certain constituents means capable of further including other constituents, and does not exclude other constituents unless particularly stated on the contrary.

In the present specification, the alkyl group may be linear or branched, and examples thereof may include a methyl group, an ethyl group, a propyl group, an isopropyl group, a butyl group, an isobutyl group, a sec-butyl group, a tert-butyl group and the like, but are not limited thereto.

In the present specification, the alkylene group means a divalent alkyl group, and may be linear or branched.

In the present specification, the aryl group may be monocyclic or polycyclic, and examples thereof may include a phenyl group, a biphenyl group, a terphenyl group, a naphthyl group, a fluorenyl group, a triphenylenyl group and the like, but are not limited thereto.

In the present specification, a CFU means a colony-forming unit, and CFU/ml means the number of CFUs per 1 ml.

Hereinafter, the present specification will be described in more detail.

One embodiment of the present specification provides a compound of the following Chemical Formula 1.

[Chemical Formula 1]

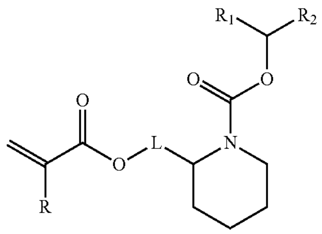

In Chemical Formula 1,

L is a direct bond; or an alkylene group having 1 to 10 carbon atoms,

R is hydrogen; or an alkyl group having 1 to 10 carbon atoms, and $R_1$ and $R_2$ are each independently hydrogen; an alkyl group having 1 to 10 carbon atoms; or an aryl group having 6 to 30 carbon atoms.

In order to introduce antibacterial properties to a polymer, the polymer and an antibacterial substance have been simply mixed in the art, however, this has a problem in that there is a possibility of leaking the antibacterial substance. In view of the above, the inventors of the present disclosure have developed a compound having an acrylate functional group introduced thereto so that an antibacterial substance is copolymerized in order to prevent antibacterial substance leakage. Specifically, an acrylate functional group is introduced to icaridin, which has been developed as an insecticide (mosquito repellent) and used in countries around the world with recognition for its safety.

In one embodiment of the present specification, Chemical Formula 1 may include one or more of the following Chemical Formulae 1-1 to 1-4.

[Chemical Formula 1-1]

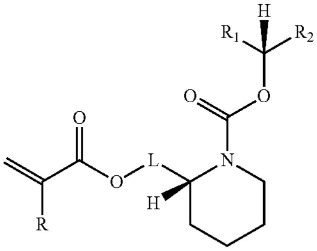

[Chemical Formula 1-2]

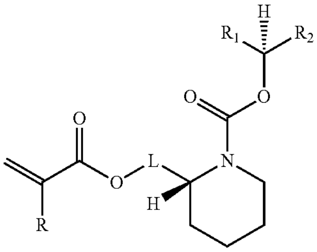

[Chemical Formula 1-3]

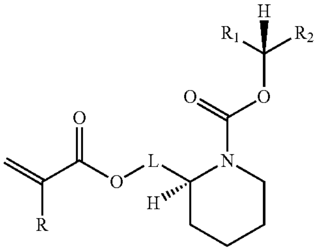

[Chemical Formula 1-4]

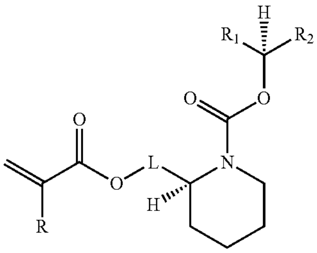

In Chemical Formulae 1-1 to 1-4, each substituent has the same definition as in Chemical Formula 1.

In one embodiment of the present specification, one or more of Chemical Formulae 1-1 to 1-4 may be mixed to form Chemical Formula 1.

In one embodiment of the present specification, L is a direct bond; or an alkylene group having 1 to 10 carbon atoms.

In one embodiment of the present specification, L may be an alkylene group having 1 to 10 carbon atoms.

In one embodiment of the present specification, L may be a linear alkylene group having 1 to 5 carbon atoms.

In one embodiment of the present specification, L may be a linear alkylene group having 1 to 3 carbon atoms.

In one embodiment of the present specification, L may be an ethylene group.

In one embodiment of the present specification, R may be hydrogen; or an alkyl group having 1 to 5 carbon atoms.

In one embodiment of the present specification, R may be hydrogen; or an alkyl group having 1 to 3 carbon atoms.

In one embodiment of the present specification, R may be hydrogen; or a methyl group.

In one embodiment of the present specification, R may be hydrogen.

In one embodiment of the present specification, $R_1$ and $R_2$ are each independently hydrogen; an alkyl group having 1 to 10 carbon atoms; or an aryl group having 6 to 30 carbon atoms.

In one embodiment of the present specification, $R_1$ and $R_2$ may be each independently hydrogen; or an alkyl group having 1 to 10 carbon atoms.

In one embodiment of the present specification, $R_1$ and $R_2$ may be each independently an alkyl group having 1 to 10 carbon atoms.

In one embodiment of the present specification, $R_1$ and $R_2$ may be each independently a linear alkyl group having 1 to 5 carbon atoms.

In one embodiment of the present specification, $R_1$ and $R_2$ may be each independently a linear alkyl group having 1 to 3 carbon atoms.

In one embodiment of the present specification, $R_1$ and $R_2$ may be each independently a methyl group; an ethyl group; or a propyl group.

In one embodiment of the present specification, $R_1$ may be a methyl group, and $R_2$ may be an ethyl group.

In one embodiment of the present specification, the compound of Chemical Formula 1 may be represented by any one of the following structures.

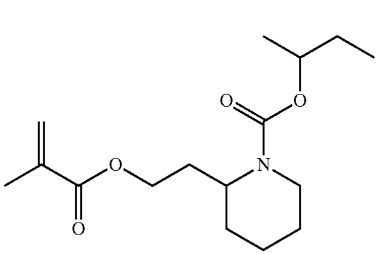

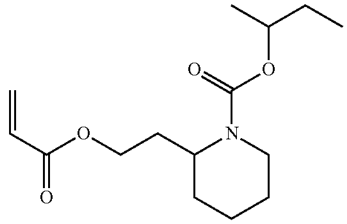 [SMILES: C=CC(=O)OCCC1CCCCN1C(=O)OC(C)CC]

The compound according to one embodiment of the present specification provides antibacterial and deodorizing effects.

In one embodiment of the present specification, when conducting an antibacterial property evaluation on the compound using the following Method 1, the compound has a bacterial growth inhibition rate of 50% or greater.

[Method 1]

After introducing 1 mg to 200 mg of the compound to a nutrient broth culture medium (25 ml) inoculated with bacteria 3000±300 CFU/ml, the result is incubated for 16 hours at 35 °C in a shaking incubator to prepare a test culture medium. A control culture medium is prepared in the same manner except that the compound is not introduced in the test culture medium. For the test culture medium and the control culture medium, absorbance at a wavelength of 600 nm is measured using a UV-Vis spectrophotometer, and using the measured absorbance value, a bacterial growth inhibition rate (%) is calculated according to the following Mathematical Formula 1.

[Mathematical Formula 1]

$$\text{Bacterial growth inhibition rate (\%)} = \left(1 - \frac{A_s}{A_0}\right) \times 100$$

($A_s$: absorbance of test culture medium, $A_0$: absorbance of control culture medium)

In one embodiment of the present specification, the bacteria used in the antibacterial property evaluation may be any one of gram-positive bacteria and gram-negative bacteria.

Bacteria are classified into gram-positive bacteria and gram-negative bacteria through gram staining depending on the structure of a cell wall. Gram-positive bacteria have a peptidoglycan layer ratio of approximately 70% to 90% in the cell wall, and stained in a purplish color when gram staining. On the other hand, gram-negative bacteria are present as a thin layer with a peptidoglycan layer ratio of approximately 10% to 20% in the cell wall, and stained in a reddish color when gram staining. Specifically, gram-positive bacteria include *Enterococcus faecalis, Staphylococcus aureus, Streptococcus pneumoniae, Enterococcus faecium, Lactobacillus lactis* and the like, and gram-negative bacteria includes *Proteus mirabilis, Escherichia coli, Salmonella typhi, Pseudomonas aeruginosa, Vibrio cholerae* and the like, but are not limited thereto.

In one embodiment of the present specification, the bacteria used in the antibacterial property evaluation may be gram-negative bacteria.

In one embodiment of the present specification, the bacteria used in the antibacterial property evaluation may be *Escherichia coli* or *Proteus mirabilis.*

In one embodiment of the present specification, when conducting the antibacterial property evaluation on the compound using Method 1, the bacterial growth inhibition rate of the compound for *Proteus mirabilis* may be 50% or greater, 55% or greater or 55.6% or greater, preferably 70% or greater, 80% or greater, 85% or greater, 89% or greater or 89.5% or greater, and more preferably 90% or greater, 91% or greater or 91.7% or greater. The upper limit is not limited, but may be, for example, 100% or less. A higher bacterial growth inhibition rate means the compound having higher antibacterial properties for *Proteus mirabilis.*

In one embodiment of the present specification, when conducting the antibacterial property evaluation on the compound using Method 1, the bacterial growth inhibition rate of the compound for *Escherichia coli* may be 50% or greater, 60% or greater, 62% or greater or 62.9% or greater, preferably 70% or greater, 80% or greater, 85% or greater, 88% or greater or 88.8% or greater, and more preferably 90% or greater, 92% or greater or 92.4% or greater. The upper limit is not limited, but may be, for example, 100% or less. A higher bacterial growth inhibition rate means the compound having higher antibacterial properties for *Escherichia coli.*

In one embodiment of the present specification, the compound may be used in 10 mg to 200 mg or in 15 mg to 200 mg in the antibacterial property evaluation. Preferably, when using the compound in 20 mg to 100 mg, a bacterial growth inhibition rate of 50% or greater may be obtained, and more preferably, when using the compound in 50 mg to 100 mg, a bacterial growth inhibition rate of 80% or greater may be obtained.

In one embodiment of the present specification, when conducting a deodorizing property evaluation on the compound using the following Method 2, the compound has a deodorization rate of 50% or greater for isovaleraldehyde.

[Method 2]

To a test solution including the compound in 1 phr to 20 phr with respect to a total weight of 80 mg of a super absorbent polymer and the compound, 20 mL of a malodorous solution is introduced, isovaleraldehyde is adsorbed using a solid-phase microextraction method, and a GC/MS peak area of the adsorbed isovaleraldehyde is analyzed through a GC/MS analysis. For a control solution prepared in the same manner except that the compound is not introduced in the test solution, a GC/MS peak area of isovaleraldehyde is analyzed in the same manner, and, using the GC/MS peak area values of the test solution and the control solution, a deodorization rate is calculated according to the following Mathematical Formula 2.

$$\text{Deodorization rate (\%)} = \left(1 - \frac{C_s}{C_0}\right) \times 100$$ [Mathematical Formula 2]

($C_s$: GC/MS peak area of isovaleraldehyde of test solution, $C_0$: GC/MS peak area of isovaleraldehyde of control solution)

In one embodiment of the present specification, the malodorous solution used in the deodorizing property evaluation may include substances known to cause malodor in urine.

In one embodiment of the present specification, the malodorous solution used in the deodorizing property evaluation may include ketones such as diacetyl; phenols such as isovaleraldehyde and p-cresol generated from amino acids such as leucine; and sulfides such as dimethyl disulfide (DMDS) and dimethyl trisulfide (DMTS).

In one embodiment of the present specification, the malodorous solution used in the deodorizing property evaluation may include one or more of isovaleraldehyde, diacetyl, dimethyl disulfide, dimethyl trisulfide and p-cresol.

In one embodiment of the present specification, the malodorous solution used in the deodorizing property evaluation includes isovaleraldehyde, and may further include one or more of diacetyl, dimethyl disulfide, dimethyl trisulfide and p-cresol.

In one embodiment of the present specification, the malodorous solution used in the deodorizing property evaluation may include isovaleraldehyde, diacetyl, dimethyl disulfide, dimethyl trisulfide and p-cresol.

In one embodiment of the present specification, when conducting the deodorizing property evaluation on the compound using Method 2, the deodorization rate of the compound for isovaleraldehyde may be 50% or greater, 60% or greater, 70% or greater, 80% or greater, 85% or greater or 87% or greater, preferably 90% or greater or 92% or greater, and more preferably 94% or greater. The upper limit is not limited, but is, for example, 100% or less.

In one embodiment of the present specification, in Method 2, diacetyl, dimethyl disulfide, dimethyl trisulfide or p-cresol may be adsorbed instead of isovaleraldehyde, and the deodorizing property evaluation for each of the components may be conducted by analyzing the GC/MS peak areas.

In one embodiment of the present specification, when conducting the deodorizing property evaluation on the compound using Method 2, the deodorization rate of the compound for diacetyl may be 50% or greater, 60% or greater, 70% or greater, 75% or greater or 79% or greater, preferably 80% or greater, 85% or greater or 86% or greater, and more preferably 90% or greater or 91% or greater. The upper limit is not limited, but is, for example, 100% or less.

In one embodiment of the present specification, when conducting the deodorizing property evaluation on the compound using Method 2, the deodorization rate of the compound for dimethyl disulfide may be 50% or greater, 60% or greater or 65% or greater, preferably 70% or greater, 75% or greater or 76% or greater, and more preferably 80% or greater, 84% or greater or 88% or greater. The upper limit is not limited, but is, for example, 100% or less.

In one embodiment of the present specification, when conducting the deodorizing property evaluation on the compound using Method 2, the deodorization rate of the compound for dimethyl trisulfide may be 15% or greater or 16% or greater, preferably 20% or greater, 25% or greater or 27% or greater, and more preferably 60% or greater, 61% or greater or 72% or greater. The upper limit is not limited, but is, for example, 100% or less.

In one embodiment of the present specification, when conducting the deodorizing property evaluation on the compound using Method 2, the deodorization rate of the compound for p-cresol may be 2% or greater, 10% or greater or 20% or greater, preferably 30% or greater, 35% or greater or 37% or greater, and more preferably 40% or greater, 46% or greater, 60% or greater or 61% or greater. The upper limit is not limited, but is, for example, 100% or less.

In one embodiment of the present specification, when conducting the deodorizing property evaluation on the compound using Method 2, the deodorization rate of the compound for diacetyl may be 50% or greater, and the deodorization rate of the compound for dimethyl disulfide may be 50% or greater.

In one embodiment of the present specification, the compound may be included in 1 phr to 20 phr based on a total weight of 80 mg of the compound and a super absorbent polymer in the deodorizing property evaluation. Preferably, the compound may be included in 2 phr or greater or 5 phr or greater, and more preferably in 8 phr or greater. When the compound is included in 5 phr or greater, significantly improved deodorizing properties may be obtained.

Another embodiment of the present specification provides an antibacterial and deodorizing composition including the compound.

In one embodiment of the present specification, the antibacterial and deodorizing composition may include one or more of a super absorbent polymer (SAP); polyethylene (PE); polypropylene (PP); polystyrene (PS); polyamide (PA); polyimide (PI); polyethylene terephthalate (PET); polyvinyl chloride (PVC); acrylonitrile-butadiene-styrene (ABS); and polyacrylic acid (PA).

In one embodiment of the present specification, the antibacterial and deodorizing composition may include the compound; and a super absorbent polymer.

In one embodiment of the present specification, the antibacterial and deodorizing composition may be in a state in which the compound, the super absorbent polymer and the like are simply mixed.

In one embodiment of the present specification, the antibacterial and deodorizing composition may be in a state before copolymerizing the compound.

In one embodiment of the present specification, the antibacterial and deodorizing composition may be copolymerized to prepare an antibacterial polymer.

Another embodiment of the present specification provides a method for preparing the compound described above, the method including reacting compounds of the following Chemical Formulae 2 and 3 (a).

[Chemical Formula 2]

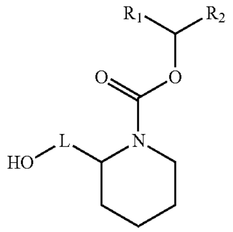

[Chemical Formula 3]

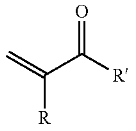

In Chemical Formulae 2 and 3,

L is a direct bond; or an alkylene group having 1 to 10 carbon atoms,

R is hydrogen; or an alkyl group having 1 to 10 carbon atoms,

R' is —Cl; —OR"; or —OC(═O)(CR"═$CH_2$).

R" is hydrogen; or an alkyl group having 1 to 10 carbon atoms, and $R_1$ and $R_2$ are each independently hydrogen; an alkyl group having 1 to 10 carbon atoms; or an aryl group having 6 to 30 carbon atoms.

In one embodiment of the present specification, specific descriptions on the substituents of Chemical Formulae 2 and 3 are the same as the descriptions on Chemical Formula 1 provided above.

In one embodiment of the present specification, R' may be —Cl.

In one embodiment of the present specification, R' is —OR", and R" may be hydrogen; or an alkyl group having 1 to 5 carbon atoms.

In one embodiment of the present specification, R' is —OC(═O) (CR"═$CH_2$), and R" may be hydrogen; or an alkyl group having 1 to 5 carbon atoms.

In one embodiment of the present specification, R' is —OC(═O) (CR"═$CH_2$), and R" may be the same as R of Chemical Formula 1.

In one embodiment of the present specification, R' may be —Cl; —OR"; or —OC(═O)(CR═$CH_2$).

In one embodiment of the present specification, the reaction time in the step of reacting (a) may vary depending on the reaction temperature and the reaction material. For example, when conducting the reaction at room temperature, the reaction time may be from 16 hours to 30 hours, and preferably from 20 hours to 26 hours. In addition, when the reaction temperature or the reaction material is different from those in preparation examples to describe later, the reaction time may be from 1 minute to 16 hours, 1 minute to 10 hours, 1 minute to 2 hours, and preferably from 10 minutes to 1 hour. Herein, the reaction material may mean the compound of Chemical Formula 3.

In one embodiment of the present specification, the step of reacting (a) may include preparing a mixture of the compounds of Chemical Formulae 2 and 3 (a1); and reacting the mixture (a2).

In one embodiment of the present specification, the reaction time in the step of reacting the mixture (a2) is the same as described above.

In one embodiment of the present specification, the step of preparing a mixture (a1) may include preparing the compounds of Chemical Formulae 2 and 3 (a1-1); preparing Mixture A by mixing the compound of Chemical Formula 2 with a solvent and a neutralizing agent (a1-2); and preparing Mixture B by mixing Mixture A and the compound of Chemical Formula 3 (a1-3).

In one embodiment of the present specification, types of the solvent are not limited, and for example, dichloromethane, dichloroethane, tetrahydrofuran, benzene, toluene, dimethylformamide and the like may be used.

In one embodiment of the present specification, types of the neutralizing agent are not limited as long as it neutralizes HCl produced during the reaction, and for example, triethylamine, pyridine, dimethylaminopyridine, sodium hydroxide, potassium carbonate and the like may be used.

In one embodiment of the present specification, stirring Mixture B (a1-4) may be further included.

In one embodiment of the present specification, the step of stirring may be conducted for 5 minutes to 20 minutes at 100 rpm to 500 rpm, and the stirred Mixture B may be kept at 0 °C.

In one embodiment of the present specification, the method for preparing the compound may further include extracting a reaction material (b). Herein, the reaction material means a material produced through the step of reacting (a).

In one embodiment of the present specification, the step of extracting a reaction material (b) may include filtering the reaction material (b1) and extracting using an extraction solvent (b2).

In one embodiment of the present specification, the filtering method is not limited as long as it is a method known in the art.

In one embodiment of the present specification, the extraction solvent may include one or more of an aqueous hydrochloric acid solution, brine and water.

In one embodiment of the present specification, the extraction solvent may further include one or more selected from among dichloromethane, diethyl ether and ethyl acetate.

In one embodiment of the present specification, the method for preparing the compound may further include washing the reaction material (c). Specifically, the reaction material may be washed using water, sodium hydrogen carbonate ($NaHCO_3$) and brine.

In one embodiment of the present specification, the method for preparing the compound may further include drying the reaction material (d). Specifically, moisture in the filtered reaction material may be removed using one or more of anhydrous magnesium sulfate ($MgSO_4$) and anhydrous sodium sulfate ($NaSO_4$), and the residual solvent may be removed under vacuum.

In one embodiment of the present specification, the method for preparing the compound may further include purifying the reaction material (e). Specifically, the reaction material may be purified through column chromatography, and as a developing solvent of the column chromatography, one or more of dichloromethane, hexane and ethyl acetate may be used.

In one embodiment of the present specification, the method for preparing the compound may further include one or more of extracting a reaction material (b); washing the reaction material (c); drying the reaction material (d); and purifying the reaction material (e).

In one embodiment of the present specification, the method for preparing the compound may include a step of reacting (a), and one or more of extracting a reaction material (b); washing the reaction material (c); drying the reaction material (d); and purifying the reaction material (e).

Hereinafter, the present specification will be described in detail with reference to examples. However, the examples according to the present specification may be modified to various different forms, and the scope of the present specification is not to be construed as being limited to the examples described below. Examples of the present specification are provided in order to more fully describe the present specification to those having average knowledge in the art.

<Preparation Example 1> Preparation of Compound 1

To a 3-neck round bottom flask capable of maintaining a nitrogen environment, icaridin (Chemscene) (20 g), triethylamine (13.05 g) and dichloromethane (120 ml) were introduced, and stirred for 10 minutes at 200 rpm. Next, acrylic chloride (15.788 g) was added dropwise to the stirred solution kept at 0 °C, and the mixture was reacted for 24 hours at room temperature. After the reaction was completed, the reaction material was filtered, and then extracted twice or more using 0.5 N hydrochloric acid (100 ml) and dichloromethane (100 ml). After that, the reaction material was washed consecutively with water, an aqueous $NaHCO_3$ solution and brine, and moisture was removed using anhydrous magnesium sulfate ($MgSO_4$). The reaction material having the solvent removed under vacuum was column chromatographed with dichloromethane to obtain Compound 1 (17.2 g, yield: 74%) having the following structure.

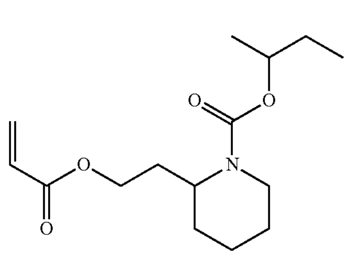

($^1$H-NMR (500 MHz, $DMSO_{d6}$): 0.9 (3H, CH), 1.3 (3H, CH), 1.4-1.8 (10H, CH), 3.3 (1H, CH), 3.6 (2H, N—CH), 4.1 (2H, 0-CH), 4.7 (1H, CH), 5.8-6.5 (3H, acryl))

<Experimental Example 1> Antibacterial Property Evaluation

To a nutrient broth culture medium (25 ml) inoculated with *Proteus mirabilis* (ATCC 29906) or *E. coli* (ATCC 25922) 3000±300 CFU/ml, Compound 1 prepared in Preparation Example 1 was introduced in a content as described in the following Table 1, and the result was incubated for 16 hours at 35 °C in a shaking incubator to prepare a test culture medium. As a control, a control culture medium was prepared in the same manner except that the compound was not introduced in the test culture medium. For the test culture medium and the control culture medium, absorbance at a wavelength of 600 nm was measured using a UV-Vis spectrophotometer. Using the measurement results, a bacterial growth inhibition rate (%) was calculated according to the following Mathematical Formula 1.

[Mathematical Formula 1]

$$\text{Bacterial growth inhibition rate (\%)} = \left(1 - \frac{A_s}{A_0}\right) \times 100$$

($A_s$: absorbance of test culture medium, $A_0$: absorbance of control culture medium)

TABLE 1

| | | *Proteus mirabilis* | | *Escherichia coli* | |
|---|---|---|---|---|---|
| | Content (mg) | Absorbance | Bacterial Growth Inhibition Rate (%) | Absorbance | Bacterial Growth Inhibition Rate (%) |
| Comparative Example 1 | 0 | 0.133 | — | 0.170 | — |
| Example 1 | 20 | 0.059 | 55.6 | 0.063 | 62.9 |
| Example 2 | 50 | 0.011 | 91.7 | 0.013 | 92.4 |
| Example 3 | 100 | 0.014 | 89.5 | 0.019 | 88.8 |

As seen from the results of Table 1, it is identified that growth of *Proteus mirabilis* or *Escherichia coli* bacteria is not inhibited at all in Comparative Example 1 that does not include the compound of Chemical Formula 1 of the present disclosure, whereas 55.6% or greater of a bacterial growth inhibition rate is obtained for *Proteus mirabilis* and 62.9% or greater of a bacterial growth inhibition rate is obtained for *Escherichia coli* in the examples. Particularly, when using 50 mg or more of the compound of Chemical Formula 1 of the present disclosure, it is seen that the bacterial growth inhibition rate for *Proteus mirabilis* or *Escherichia coli* increases to 89.5% or greater or 88.8% or greater, respectively.

<Experimental Example 2> Deodorizing Property Evaluation

Compound 1 prepared in Preparation Example 1 was introduced to a vial in a content as described in the following Table 2, and after introducing a super absorbent polymer (LG Chem., GS-301N) thereto so that a total content of the super absorbent polymer and Compound 1 becomes 80 mg, a malodorous solution (20 mL) was introduced thereto to prepare a test solution. As the malodorous solution, a solution in which diacetyl (242 ug/mL), isovaleraldehyde (49 ug/mL), dimethyl disulfide (30 ug/mL), dimethyl trisulfide (26 ug/mL) and p-cresol (2508 ug/mL) are mixed was 1/1000 diluted using an aqueous sodium chloride solution (0.9% by weight) and used. Volatile substances generated in the test solution was adsorbed using a solid-phase microextraction method (SPME), and through a GC/MS analysis, GC/MS peak areas of the adsorbed malodorous substances (diacetyl, isovaleraldehyde, dimethyl disulfide, dimethyl trisulfide and p-cresol) were each analyzed. For a control solution prepared in the same manner except that Compound 1 was not included, peak areas of the malodorous substances were analyzed in the same manner, and deodorization rates thereof were each calculated according to the following Mathematical Formula 2.

[Mathematical Formula 2]

$$\text{Deodorization rate (\%)} = \left(1 - \frac{C_s}{C_0}\right) \times 100$$

($C_s$: GC/MS peak areas of malodorous substances test solution, $C_0$: GC/MS peak areas of malodorous substances of control solution)

TABLE 2

| Malodorous | Deodorization rate (%) for Each Content of Compound 1 | | | | |
|---|---|---|---|---|---|
| Substance | 1 phr | 2 phr | 5 phr | 8 phr | 10 phr |
| Diacetyl | 79 | 86 | 91 | 92 | 93 |
| Isovaleraldehyde | 87 | 92 | 94 | 95 | 95 |
| Dimethyl Disulfide | 65 | 76 | 84 | 88 | 88 |
| Dimethyl Trisulfide | 16 | 27 | 61 | 72 | 76 |
| p-Cresol | 2 | 20 | 37 | 46 | 61 |

As seen from the results of Table 2, the deodorization rates of the malodorous substances for the test solution including the compound of Chemical Formula 1 of the present disclosure are 79% or greater for diacetyl, 87% or greater for isovaleraldehyde, 65% or greater for dimethyl disulfide, 16% or greater for dimethyl trisulfide and 2% or greater for p-cresol, and it is identified that the deodorization rates are enhanced as the content of Compound 1 increases. Through the results, it is seen that significantly improved deodorizing properties are obtained by including the compound of Chemical Formula 1 of the present disclosure in 5 phr or greater.

The invention claimed is:

1. An antibacterial and deodorizing composition comprising a compound of Chemical Formula 1; and one or more of polyethylene, polypropylene, polystyrene, polyamide, polyimide, polyethylene terephthalate, polyvinyl chloride, acrylonitrile-butadiene-styrene, or polyacrylic acid:

[Chemical Formula 1]

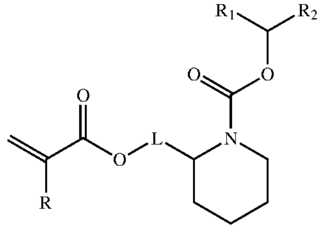

in Chemical Formula 1,

L is a direct bond, or an alkylene group having 1 to 10 carbon atoms;

R is hydrogen, or an alkyl group having 1 to 10 carbon atoms; and $R_1$ and $R_2$ are each independently an alkyl group having 1 to 10 carbon atoms, or an aryl group having 6 to 30 carbon atoms.

2. The antibacterial and deodorizing composition of claim 1, wherein $R_1$ and $R_2$ are each independently an alkyl group having 1 to 10 carbon atoms.

3. The antibacterial and deodorizing composition of claim 1, wherein L is an alkylene group having 1 to 5 carbon atoms.

4. The antibacterial and deodorizing composition of claim 1, wherein the compound has a bacterial growth inhibition rate of 50% or greater when conducting an antibacterial property evaluation on the compound using Method 1:

[Method 1]

1 mg to 200 mg of the compound is introduced to a nutrient broth culture medium (25 ml) inoculated with bacteria 3000±300 CFU/ml, and this resultant mixture is incubated for 16 hours at 35 °C in a shaking incubator to prepare a test culture medium, a control culture medium is prepared in the same manner except that the compound is not introduced in the test culture medium, and for the test culture medium and the control culture medium, absorbance at a wavelength of 600 nm is measured using a UV-Vis spectrophotometer, and using the measured absorbance value, a bacterial growth inhibition rate (%) is calculated according to Mathematical Formula 1:

$$\text{Bacterial growth inhibition rate (\%)} = \left(1 - \frac{A_s}{A_0}\right) \times 100 \quad \text{[Mathematical Formula 1]}$$

wherein $A_s$ is the absorbance of test culture medium, and $A_0$ is the absorbance of control culture medium.

5. The antibacterial and deodorizing composition of claim 4, wherein the bacteria are gram-positive bacteria or gram-negative bacteria.

6. The antibacterial and deodorizing composition of claim 1, wherein the compound has a deodorization rate of 50% or greater for isovaleraldehyde when conducting a deodorizing property evaluation on the compound using Method 2:

[Method 2]

20 mL of a malodorous solution including a malodorous substance is introduced to a test solution including the compound in 1 phr to 20 phr with respect to a total weight of 80 mg of an absorbent polymer and the compound, the malodorous substance is adsorbed using a solid-phase microextraction method, a GC/MS peak area of the adsorbed malodorous substance is analyzed through a GC/MS analysis, and for a control solution prepared in the same manner except that the compound is not introduced in the test solution, a GC/MS peak area of the malodorous substance is analyzed in the same manner, and, using the GC/MS peak area values of the test solution and the control solution, a deodorization rate is calculated according to Mathematical Formula 2:

$$\text{Deodorization rate (\%)} = \left(1 - \frac{C_s}{C_0}\right) \times 100 \quad \text{[Mathematical Formula 2]}$$

wherein $C_s$ is the GC/MS peak area of the malodorous substance of test solution, and $C_0$ is the GC/MS peak area of the malodorous substance of control solution), and wherein the malodorous substance includes isovaleraldehyde when Method 2 is used to determine the deodorization rate for isovaleraldehyde.

7. The antibacterial and deodorizing composition of claim 6, wherein the malodorous substance further includes one or more of diacetyl, dimethyl disulfide, dimethyl trisulfide or p-cresol.

8. The antibacterial and deodorizing composition of claim 7, wherein the compound has a deodorization rate of 50% or greater for the diacetyl and a deodorization rate of 50% or greater for the dimethyl disulfide when conducting the deodorizing property evaluation on the compound using Method 2 and, wherein the malodorous substance further includes the diacetyl and the dimethyl disulfide, and when Method 2 is used to determine the deodorization rate for diacetyl or the dimethyl disulfide in addition to the isovaleraldehyde.

9. The antibacterial and deodorizing composition of claim 1, wherein the compound is included in 1 phr to 20 phr based on a total weight of 80 mg of the compound and the absorbent polymer.

* * * * *